May 21, 1957
S. R. GORDON
2,792,961
TACKLE BOX
Filed May 21, 1954
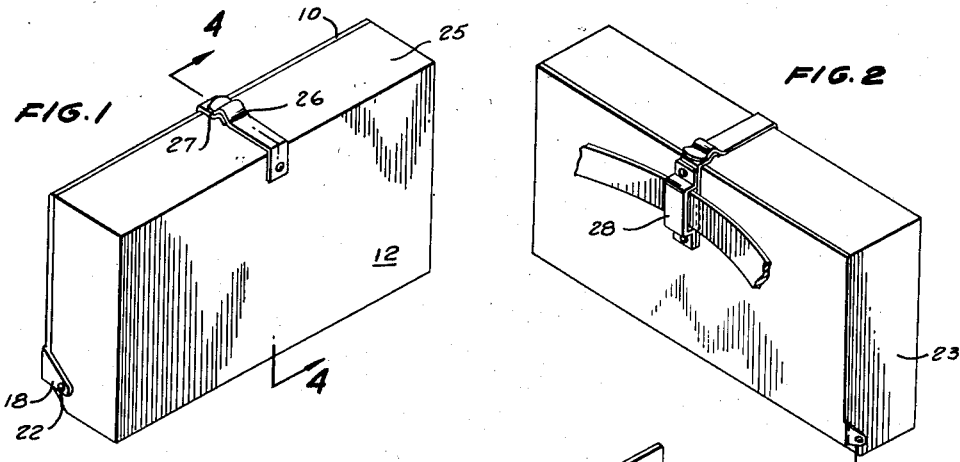
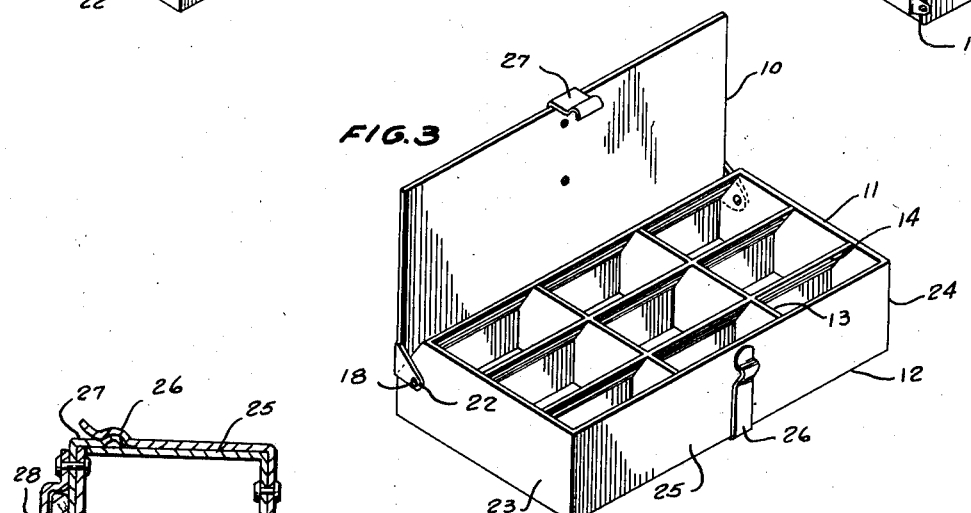
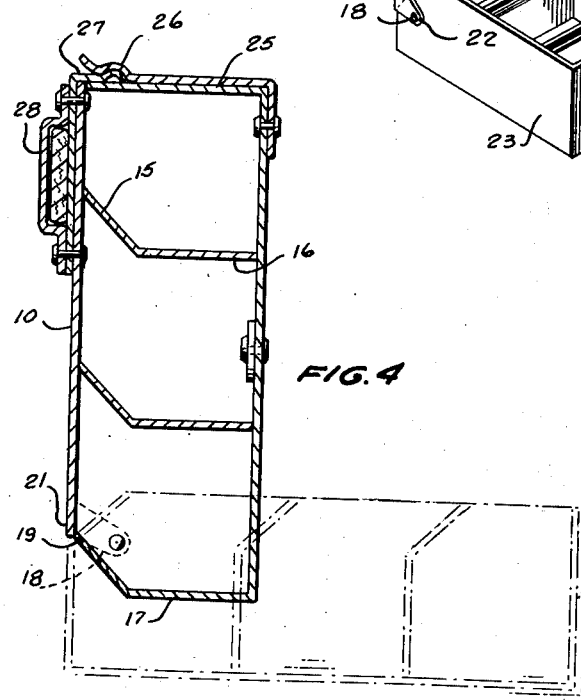
INVENTOR.
SAMUEL R. GORDON
BY
McMorrow, German & Davidson
ATTORNEYS

United States Patent Office 2,792,961
Patented May 21, 1957

2,792,961
TACKLE BOX

Samuel R. Gordon, Waynesboro, Va.

Application May 21, 1954, Serial No. 431,474

2 Claims. (Cl. 220—20)

The present invention relates to an improvement in fishing tackle boxes of the type that are used to contain flies, lures, hooks and sinkers, and is carried by the fisherman on his belt or on a special harness strap.

The improvement of the invention consists of the shape and position of the partitions within the box which form small compartments within which the various articles are kept separate and readily accessible.

The primary object of the present invention is to provide a fishing tackle box in which the compartments have special means for preventing the lures and hooks from sliding outwardly when the lid is opened.

Another object of the present invention is to provide a fishing tackle box which swings outwardly to a horizontal position and need not be supported in that position while a lure or hook is being selected.

A further object of the present invention is to provide a fishing tackle box having shelves or partitions separating the various articles and which are shaped to prevent accidental loss of the articles as the box is opened.

These and other objects and advantages of the present invention will be fully apparent upon consideration of the following description and the annexed drawings, in which:

Figure 1 is a view in perspective of the tackle box in closed condition.

Figure 2 is another view in perspective of the tackle box showing its side which attaches to a belt.

Figure 3 is a view of the box in perspective, showing it open, and

Figure 4 is a view in cross section taken on line 4—4 of Figure 1 showing the open position of the box in dotted lines.

Referring in greater detail to the drawing in which like reference numerals indicate like parts throughout the several views, the tackle box of this invention is seen to consist of an upstanding lid 10 which in normally closed position is in confronting face to face relation with the open side 11 of the container 12.

Within the container 12 are the vertical partitions 13 and the other partitions 14, each of the latter are formed with a portion 15 of their width bent upward at a substantial angle, the remaining portions 16 being horizontal when the box or container is closed and in the vertical position.

The lower end wall 17 of the container 12 is shaped like the partitions 14 and because the lid 10 is hingedly connected to the container 12 by its bent over tabs 18 at a spaced distance from the lower end edge or junction 19 of the angled and horizontal portions of the lower end wall 17, the lower end edge 21 of the lid 10 abuts against this junction and prevents the container from swinging downwardly more than 90°. A rivet 22 secures the tabs 18 to the container side walls 23 and 24 for pivotal movement thereon.

On the top wall 25 of the container 12, a catch 26 is formed by a bent and curved piece of strap, extending over the front edge and riveted in place. A similarly bent and curved strap forms another catch 27 which is riveted to the lid 10, and slides under the catch 26 when the lid is closed. This forms a secure arrangement for keeping the lid closed, although a simple lifting movement of catch 26 by the thumb will release it and permit the container to swing outwardly to a horizontal position.

On the rear face or non-confronting face of the lid 10, another strap is bent and riveted by the same rivets which hold the catch 27 in place, and forms a belt-engaging loop or bracket 28 by means of which the fisherman may secure the tackle box to his person for ready accessibility of his various lures, flies and other equipment.

It will be readily understood that the angled upward shape of the horizontal partitions prevent the tackle from sliding outward when the box is opened, and permit the container to be carried on its side so to speak, with the lid vertical. It is to be also understood that the angled partitions, here shown as angled upwardly from a line drawn somewhat closer to the open side of the container than midwidth, may also be slanted more sharply or less sharply, and may be angled from any line midwidth or closer to the top or bottom of each of the compartments thusly formed.

As conceived, the preferred material of the tackle box of this invention is sheet aluminum, but other material can be used, and the size of the box thusly formed may range from one-half inch to one inch and one-half in depth, and from three inches wide and four inches long to seven inches wide and eight inches long, although other sizes may be constructed and used, and many other changes and modifications may be made and practiced without departing from the spirit and scope of the invention as set forth in the following claims.

What is claimed is:

1. A fishing tackle box comprising an upstanding container having an open side, a lid having spaced tabs projecting perpendicularly therefrom hingedly connected to said container at its lower end wall and being in confronting face to face relation with said open side when normally closing said container, said lower end wall of said container having a portion of its width adjacent said open side disposed at an upward angle, the remaining portion of its width being horizontally disposed and forming at its junction with said angled portion an abutment engageable with said lid at its lower end edge for restraint of movement of said container more than 90° with respect to said lid.

2. A fishing tackle box comprising an upstanding container having an open side, a lid having spaced tabs projecting perpendicularly therefrom hingedly connected to said container at its lower end wall and being in confronting face to face relation with said open side, said lid normally closing said container, vertical partitions in said container, other partitions in said container intersecting said vertical partitions at right angles thereto, said other partitions having the portions of their widths adjacent said open side disposed at an upward angle, a similar portion of said container having its lower end wall similarly disposed, the remaining portions of said other partitions and said wall being disposed horizontally, said wall at its junction between said upwardly angled portion and its remaining portion forming an abutment engageable by said lid at the lower end thereof for restraint of swinging movement of more than 90° with respect to said lid.

References Cited in the file of this patent

UNITED STATES PATENTS

| 555,615   | Pedrick     | Mar. 3, 1896  |
| 682,524   | Bonnemaison | Sept. 10, 1901 |
| 1,549,400 | Wimler      | Aug. 11, 1925 |
| 1,827,929 | Bigelow     | Oct. 20, 1931 |
| 1,905,622 | D'Angelo    | Apr. 25, 1933 |
| 2,145,143 | Trecartin   | Jan. 24, 1939 |
| 2,226,184 | Storer      | Dec. 24, 1940 |
| 2,645,334 | Aldridge    | July 14, 1953 |